Feb. 5, 1924.                                              1,482,419
H. B. WILKINSON
AUTOMOBILE SIGNAL
Filed Feb. 19, 1923
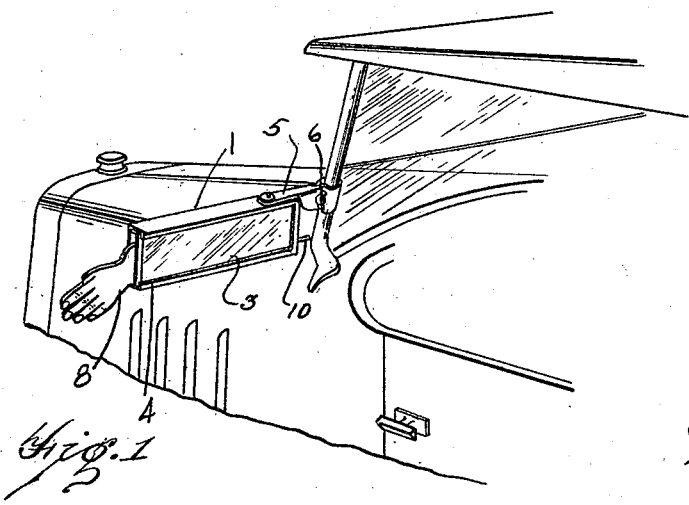
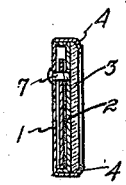
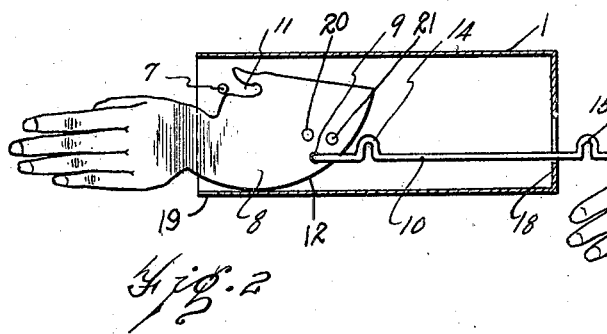
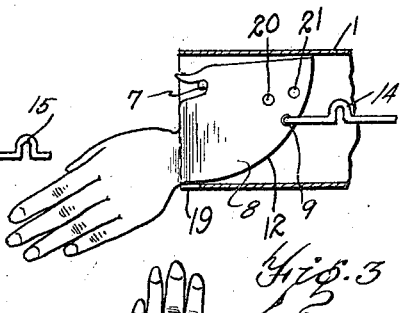
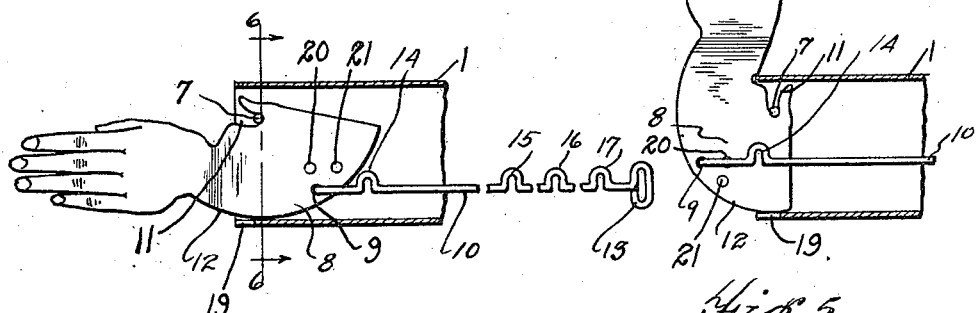
Inventor
Henry B. Wilkinson
By
Attorney Patented Feb. 5, 1924.

1,482,419

UNITED STATES PATENT OFFICE.

HENRY B. WILKINSON, OF PONTIAC, MICHIGAN.

AUTOMOBILE SIGNAL.

Application filed February 19, 1923. Serial No. 619,886.

*To all whom it may concern:*

Be it known that I, HENRY B. WILKINSON, a citizen of the United States, residing at Pontiac, county of Oakland, State of Michigan, have invented a certain new and useful Improvement in Automobile Signals, and declare the following to be a full, clear, and exact description of the same, such as will enable others skilled in the art to which it pertains to make and use the same, reference being had to the accompanying drawings, which form a part of this specification.

This invention relates to signals and the object of the invention is to provide a direction indicating signal for automobiles, street cars, motor boats or the like by which a left or right hand turn may be indicated as well as stop. Another object of the invention is to provide an automobile signal which may be manually operated from the interior of an automobile or other vehicle and is adapted to be used with closed vehicle bodies as well as the open types. A further object of the invention is to provide an automobile signal comprising a casing having an indicating device movable therein, the indicating device being adapted to be extended from the casing to indicate by different positions stop or a left or right hand turn. A further object of the invention is to provide a sheet metal casing adapted to be attached to the side of an automobile and being similar to a sleeve from which an indicating device formed to represent a hand may be extended, a pivot being provided in the casing with which the indicating device may be moved to engagement to turn the hand to different indicating positions. These objects and the several novel features of the invention are hereinafter more fully described and claimed and the preferred form of construction by which these objects are attained is shown in the accompanying drawings in which—

Fig. 1 is a view of the automobile signal as attached to an automobile.

Fig. 2 is a view of the signal partly extended, part of the casing being removed to show the construction.

Fig. 3 is a view of the signal in position to indicate a stop.

Fig. 4 is a similar view of the signal in position to indicate a left hand turn.

Fig. 5 is a view of the signal in position to indicate a right hand turn.

Fig. 6 is a section taken on line 6—6 of Fig. 4.

The casing as shown in Fig. 6 comprises two parts 1 and 2 the part 2 being adapted to fit within the part 1. A mirror 3 is positioned over the part 2 and the part 1 is provided with flanges 4 which engage over the mirror and hold it in place. As shown in Fig. 1 a bracket 5 is secured to the casing 1 and is adapted to be secured by means of a wing nut 6 to the windshield of an automobile or other vehicle. This provides the most convenient manner of attaching the device to the touring and roadster types of automobiles but the device may be secured to automobiles or other vehicles in any suitable manner desired. When the device is attached to automobiles of the sedan type the casing may be secured directly to the side of the automobile with the operating member extending therethrough at a convenient point within the driver's reach. By providing the mirror 3 the casing may be adjusted on the bracket 5 so that the driver may see to the rear without turning around and, if desired, a parking light or spot light may be mounted on the casing 1 without interfering with the operation of the device. As shown in Fig. 6 a small bolt or rivet 7 connects the two parts 1 and 2 of the casing and provides a pivot on which the indicating device 8 may be turned. The end of the indicating device 8 is formed to represent a hand and the casing 1 provides a sleeve from which the hand may be extended. The indicating device 8 is provided with an aperture 9 in which an operating rod 10 is pivotally mounted and by moving the indicating device to the position shown in Fig. 2 the hand drops by gravity to the position shown in Fig. 3. This causes the notch 11 of the indicating device 8 to engage over the bolt or rivet 7 and prevents further longitudinal movement of the member 8 the indicating device providing a stop signal when in this position as shown in Fig. 3. By further moving the rod 10 to the left the hand is turned on the pivot 7 to the position shown in Fig. 4 to indicate a left hand turn. By again moving the rod 10 to the left, the hand is turned up to the position shown in Fig. 5 to indicate a right hand turn the signal member 8 being so designed that when the notch 11 engages over the pivot 7 the curved face 12 of the signal rides on the bottom of the casing. By drawing the rod 10 to the right the hand may be completely withdrawn within the sleeve and the casing is designed so that it does not extend beyond the fenders or running board of the automobile when secured in position but the device thus positioned may be readily seen from the rear so that the various signals may be properly exposed to view.

Various means may be used to move the signals to the different positions either mechanically, automatically or manually. For the purpose of illustration I have shown a manual means for operating the device comprising a rod 10 having an operating handle 13 on the end thereof. This rod 10 is bent to form a series of notches 14, 15, 16 and 17 to correspond to the different positions and the edge 18 of the casing over which the rod is adapted to ride is upturned to engage in the different notches. When the hand is withdrawn within the casing the notch 14 engages over the edge 18. To extend the signal the rod is raised and moved to the left and the different notches 15, 16 and 17 may be engaged over the edge 18. When the notch 15 is engaged thereover the hand takes the stop position shown in Fig. 3 and when the rod is moved so that the notch 16 engages the edge 18 the hand takes the position shown in Fig. 4 to indicate a left hand turn and when the rod 10 is moved to bring the notch 17 into engagement with the edge 18 the hand is turned upwardly to the position shown in Fig. 5 to indicate a right hand turn. By this arrangement the hand may be moved to any desired position and by lowering the rod so that the respective notch engages over the edge 18 the hand may be locked in the respective positions and will be held in this position until the hand is moved to another position or withdrawn into the casing. If desired by shaping the hand to engage further over the upper part of the casing the hand may be turned further than shown in Fig. 5 to indicate a right hand turn and if desired the lower edge of the box at the end may be provided with a notch 19 to allow the hand to extend further downward to indicate stop. If desired extra holes 20 and 21 may be provided in the indicating device 8 to allow the rod 10 to be connected at different points for more effective operation and the indicating device is operable by both a right and left hand motion of the rod 10 as will be readily understood. When used on trucks where the body extends beyond the running board the device may be secured to the truck so that only the end of the casing extends beyond the body thus allowing the hand to be readily exposed to view.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a signal, a casing adapted to be secured to a support, a sheet metal indicating device in the shape of a hand adapted to be moved longitudinally of the casing to extend from the end thereof, a pivot pin adjacent the open end of the casing, the hand being provided with a notch for engaging the pivot pin at the end of its longitudinal movement, the hand as it is extended from the casing dropping below the horizontal with the notch thereof engaging over the pivot pin, and manually operable means for turning the hand to different positions on the pivot pin.

2. In a signal, a casing adapted to be secured to a support, a sheet metal indicating device in the shape of a hand adapted to be moved longitudinally of the casing to extend from the end thereof, a pivot pin adjacent the open end of the casing, the hand being provided with a notch for engaging the pivot pin at the end of its longitudinal movement and being provided with an arcuate edge resting on the bottom of the casing, manually operable means for moving the hand longitudinally of the casing to engage the notch thereof over the said pivot pin, continued movement of the hand turning the hand to vertical position on the pivot pin.

3. In a signal, a casing adapted to be secured to a support, an indicating device adapted to be moved longitudinally of the casing to extend from the end thereof, a pivot pin adjacent the open end of the casing, the indicating device being provided with an arcuate face resting on the bottom of the casing and being also provided with a notch concentric with the arcuate face adapted to engage over the pivot pin, a rod manually movable to move the indicating device longitudinally of the casing, the indicating device being adapted to be turned to vertical position upon continued movement of the rod subsequent to engagement of the notch of the indicating device over the said pivot pin.

4. In a signal, a casing adapted to be secured to a support, an indicating device adapted to be moved longitudinally of the casing to extend from the end thereof, a pivot pin adjacent the open end of the casing, the indicating device being provided with an arcuate face by which it is supported on the bottom of the casing and being also provided with a notch concentric with the arcuate face adapted to engage over the pivot pin, a rod manually movable to move the indicating device longitudinally of the casing, the indicating device being adapted to be turned to vertical position upon continued movement of the rod subsequent to engagement of the notch of the indicating device over the said pivot pin, and means whereby the rod may be supported in different positions to support the indicating device at different positions on the pivot pin.

In testimony whereof, I sign this specification.

HENRY B. WILKINSON.